INVENTOR.
Susumu Kuwabara
BY Hancock, Downing & Seebold
Attorneys

United States Patent Office 3,465,940

Patented Sept. 9, 1969

3,465,940
INTERCHANGEABLE FOUR-TRACK AND EIGHT-TRACK MAGNETIC RECORDING AND REPRODUCING DEVICE

Susumu Kuwabara, Tokyo-to, Japan, assignor to Beltek Kabushiki Kaisha, Tokyo-to, Japan, a joint-stock company of Japan Filed Dec. 5, 1967, Ser. No. 688,089
Claims priority, application Japan, Dec. 10, 1966, 41/112,213
Int. Cl. B65h *17/20;* G11b *5/00*
U.S. Cl. 226—176 4 Claims

ABSTRACT OF THE DISCLOSURE

Four-track and eight-track tape cartridges are distinguished by the difference of one type having an aperture and the other type not having an aperture into which a lug of a mechanism in a magnetic recording and reproducing device can enter when the cartridge with the aperture is inserted, thereby causing a pinch roller of the device to swing into operational position against the tape and a capstan. The type of cartridge without the aperture does not actuate the pinch roll of the device but has a built-in pinch roller for direct contact with the tape against the capstan. The two types of cartridges can be used interchangeably for automatically interchanged operation.

This invention relates generally to magnetic sound recording and reproducing devices and more particularly to a new device in which, by inserting thereinto interchangeably a cartridge containing tape with four tracks and a cartridge containing tape with eight tracks (hereinafter referred to as four-track and eight-track cartridges), four-track and eight-track recording and reproducing can be accomplished in an automatic manner without additional interchangeing or switching operations.

More specifically, the present invention provides, in a magnetic recording and reproducing device in which four-track and eight-track operation can be interchangeably accomplished, the combination therewith of four-track type cartridges, eight-track type cartridges, one of the two types having an aperture establishing a difference distinguishing that type from the other, and means in the device for detecting the difference and automatically accomplishing four-track and eight-track recording and reproducing in accordance with the difference.

A feature of the device according to the invention is that when one type of cartridge having a bottom aperture is inserted thereinto, the mere action of insertion of the cartridge causes a pinch roller installed in the device to swing automatically upright to press the tape in the cartridge against a capstan. Extraction of this cartridge causes the pinch roller to swing back into its original position in preparation for the succeeding operation. Then, when the other type of cartridge is inserted into the device, the pinch roller does not swing into operational position, but a built-in pinch roller installed within the cartridge itself operates to press the tape against the capstan. The interchange or switching between the operations of these two types of cartridges is accomplished automatically.

In the example illustrated in the accompanying drawing and described hereinafter, each of the four-track cartridges is provided in the bottom thereof with an aperture into which a lug of a mechanism enters to cause a pinch roller to swing into operational position and press against the tape when the cartridge is inserted into the device. Each of the eight-track cartridges is provided with a built-in pinch roller and does not have an aperture in the bottom. The presence and absence of the aperture establishes a difference distinguishing the two types of cartridges from each other, which difference is utilized to accomplish automatically the aforementioned interchangeable four-track and eight-track operation.

The nature, principle, details, and utility of the invention will be more clearly apparent from the following detailed description with respect to a preferred embodiment of the invention when read in conjunction with the accompanying drawings, in which like parts are designated by like reference numerals.

Figure 1:
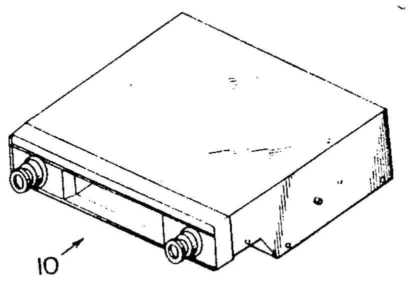
FIG. 1 is a perspective view of a magnetic recording and reproducing apparatus in which the device of the invention is incorporated, said view showing the front, right side, and top of the apparatus.
Figure 2:
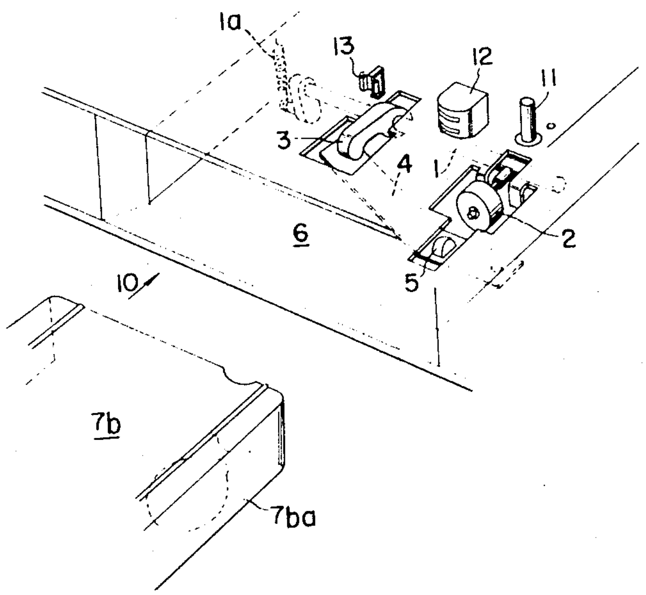
FIG. 2 is a partial perspective view showing the essential internal parts of the apparatus shown in FIG. 1 and indicating the manner in which one type of cartridge is about to be inserted thereinto.
Figures 3, 4A:
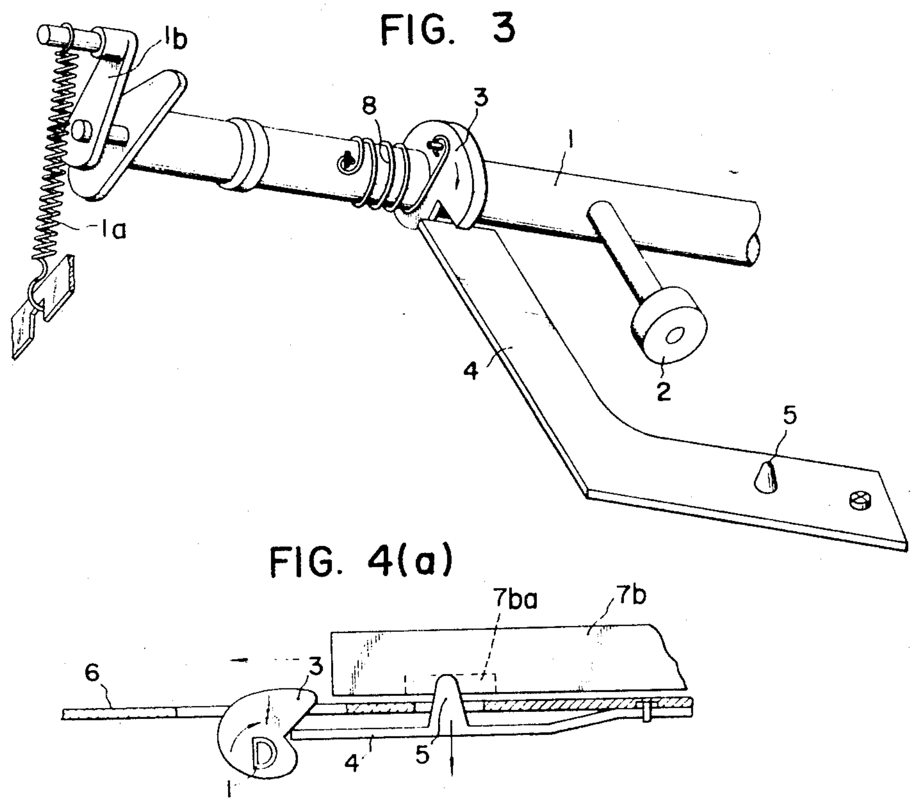
FIG. 3 is a perspective view showing one example of a magnetic sound recording and reproducing device embodying the invention.
Figure 4B:
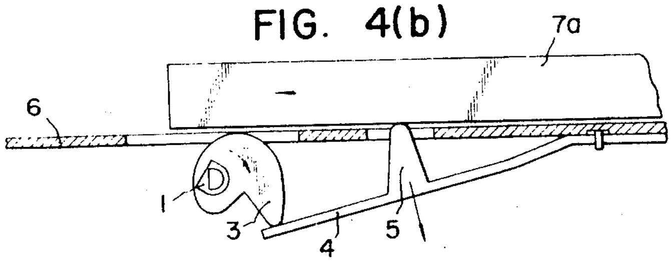

FIGS. *4a* and *4b* are elevational views, partly in section as viewed from left to right in FIG. 3, respectively showing different operational states; and FIGS. *5a* and *5b* are fragmentary perspective views respectively showing the leading bottom parts of eight-track and four-track recording tape cartridges suitable for use in the apparatus shown in FIGS. 1 and 2.

The device of the invention is suitable for magnetic recording and reproducing apparatuses adapted to be loaded with tape in cartridges of two types, one example of such apparatuses being illustrated in FIGS. 1 and 2. A cartridge (for example, *7b*) is inserted into the apparatus through an entrance opening 10 in the front panel thereof and caused to slide inward along and on a base plate 6 until it is stopped at its operational position.

During this insertion of the cartridge, the cartridge itself actuates the device of the invention to cause a pinch roller 2 normally disposed below the base plate 6 to swing upward (in the case of four-track tape cartridge) into the cartridge to press the tape (not shown) therewithin against a capstan 11, as described more fully hereinafter. The tape can then be driven by the capstan 11 past a sensor 13 and a head 12 in the conventional manner.

When the other type of cartridge is inserted through the entrance opening 10, it acts to prevent the device from raising the pinch roller 2, in place of which a built-in pinch roller 2a within the cartridge, as shown in FIG. *5a,* operates to press the tape against the capstan 11.

The organization and operation of the device will now be described in detail below with reference to FIGS. 3, *4a, 4b, 5a* and *5b*.

Slightly below the base plate 6, there is provided a horizontally and rotatably supported shaft 1 supporting the pinch roller 2 fixed to a part thereof. A cam 3 is also supported on this shaft 1, with the coupling therebetween being in the form of an opening of the shape of the character D in the cam 3 fitted loosely with some clearance around a part of D-shaped cross section of the shaft 1 as shown in FIGS. *4a* and *4b*. The clearance in this coupling is such that the cam 3 can rotate with a specific limited play relative to the shaft 1 in both rotational directions from the aligned relative position indicated in FIG. *4a*. Furthermore, a spring 8 is installed between the shaft 1 and the cam 3 to exert constantly a torque on the cam 3 as indicated by an arrow in FIG. 3.

The cam 3 is shaped and adapted to operate cooperatively with the free end of a holding member 4 in the form of a leaf spring fixed at the other end to the lower surface of the base plate 6, with the natural unstrained state of the holding member 4 being flush against the lower surface of the base plate 6. The holding member 4, at an intermediate part thereof, supports an upwardly projecting lug 5 which can project above the base plate 6 through a hole therein.

Figure 5A:
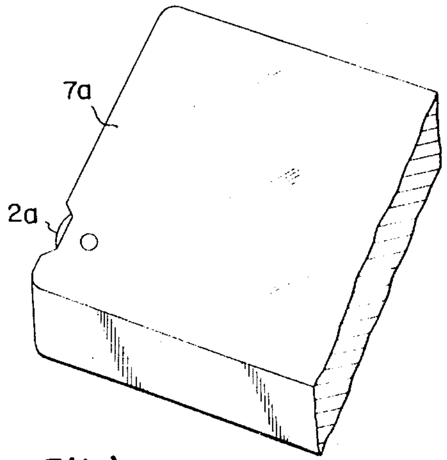
Figure 5B:
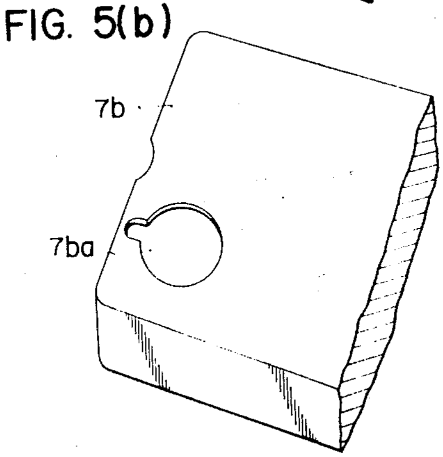

When a four-track cartridge is inserted, the projecting lug 5 is not depressed because of an aperture 7*ba* in the bottom of the cartridge as indicated in FIGS. 4*a* and 5*b*. Consequently, the cam 3 and the holding member 4 assume the positions indicated in FIG. 4*a*, and clockwise rotation of the cam due to the spring 8 is stopped.

Furthermore, while the shaft 1 is below the base plate 6, the tip of the cam 3 and the lug 5 can project above the base plate 6, and since the aperture 7*ba* is provided in the cartridge 7*b* as shown in FIG. 5*b* in the case of four tracks, the lug 5 is not depressed. Accordingly, the holding member 4 and cam 3 remain in the engaged state indicated in FIG. 4*a*, in which the tip of the cam 3 is projecting above the base plate. Therefore, as the cartridge 7*b* is inserted further, the leading edge thereof contacts and rotates the cam 3, in the counterclockwise direction as viewed in FIG. 4*a* and, subsequently, the shaft 1, thereby to bring the pinch roller 2 into contact with the capstan 11 for four-track recording or reproducing.

In this operation, the aforementioned play in the coupling between the cam 3 and shaft 1 causes a delay in the actuation of the shaft 1 relative to the rotation of the cam 3. Accordingly, the pinch roller 2 is swung into the cartridge 7*b* and into operational position during the very last part of the stroke of the cartridge, whereby the pinch roller 2 can enter the cartridge 7*b* without striking the cartridge casing.

A spring 1*a*, in combination with a crank 1*b* rotating through a dead-center position, is adapted to exert a torque on the shaft 1 for applying a pressing force to the pinch roller 2 toward the capstan 11 and to return the pinch roller 2 to its original position when the cartridge is extracted.

In the eight-track cartridge 7*a* (FIG. 5*a*), an aperture corresponding to the above mentioned aperture 7*ba* is not provided. Accordingly, when the cartridge 7*a* is inserted, the bottom of the cartridge depresses the lug 5 and, therefore, the holding member 4, which thereupon descends. Consequently, only the cam 3 is permitted by the tip of the member 4 and caused by spring 8 to rotate clockwise to the limit of the aforementioned play. The cam 3 has a shape such that, in this clockwisely rotated state, no part thereof projects above the base plate 6. Accordingly, the shaft 1 is not actuated by the insertion of the cartridge 7*a*, and a built-in pinch roller 2*a* provided in the cartridge 7*a* directly contacts the capstan over the tape to accomplish eight-track recording or reproducing.

Thus, the present invention provides a magnetic recording and reproducing device whereby interchanging between four-track and eight-track operation can be readily and automatically accomplished.

What I claim is:

1. A magnetic recording and reproducing device operable with both four-track tape cartridges and eight-track tape cartridges, interchangeably, which comprises: a body having an opening at one side thereof to permit insertion of a tape cartridge, a shaft rotatably supported at the bottom part of said body, a cam supported on said shaft with a limited range of rotational movement relative thereto and having a projection tip, a capstan fixed at one portion in said body, a pinch roller fixed on one part of said rotatable shaft at a position to cooperatively operate with said capstan, a spring biasing said cam toward one limit of said range, a holding member fixed at one end to a bottom part, the other end of which is in contact with said cam to be depressed and raised in accordance with the rotational movement of said cam, and a projecting lug on said holding member which appears and disappears through an aperture provided in said bottom part following the movement of the cam.

2. The device according to claim 1, wherein said device operates in combination with a four-track tape cartridge having an aperture therein at a position to receive said projecting lug on said holding member, said holding member holding the cam in a state of being engaged at the tip end thereof with said cartridge, the shaft being rotated to bring the pinch roller into contact with the capstan over a tape.

3. The device according to claim 1, wherein said device operates in combination with an eight-track tape cartridge provided with a built-in pinch roller in the leading edge of insertion thereof to directly contact the capstan over the tape, the bottom of said cartridge depressing said lug to permit the cam to rotate to said one limit of said range, whereby said cartridge is inserted without engaging said cam.

4. The device according to claim 1, wherein said shaft is in D-shaped cross-section, the support coupling between said shaft and cam being loose with clearance to cause a delay in the actuation of said shaft relative to the rotation of said cam to enable the pinch roller to enter the cartridge without striking the casing thereof.

References Cited

UNITED STATES PATENTS 3,027,112 3/1962 Flan ---------------- 226—180
3,113,708 12/1963 Moulic -------------- 226—180

ALLEN N. KNOWLES, Primary Examiner

U.S. Cl. X.R.

226—180; 274—4